US009562437B2

(12) United States Patent
Kollati et al.

(10) Patent No.: US 9,562,437 B2
(45) Date of Patent: Feb. 7, 2017

(54) TURBINE BLADE AIRFOILS INCLUDING FILM COOLING SYSTEMS, AND METHODS FOR FORMING AN IMPROVED FILM COOLED AIRFOIL OF A TURBINE BLADE

(71) Applicant: HONEYWELL INTERNATIONAL INC., Morristown, NJ (US)

(72) Inventors: Vighneswara Rao Kollati, Andhra Pradesh (IN); Balamurugan Srinivasan, Bangalore (IN); Jong Liu, Scottsdale, AZ (US); Daniel C. Crites, Mesa, AZ (US); Luis Tapia, Maricopa, AZ (US); Malak Fouad Malak, Tempe, AZ (US); Rajiv Rana, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1011 days.

(21) Appl. No.: 13/871,655

(22) Filed: Apr. 26, 2013

(65) Prior Publication Data
US 2014/0356188 A1    Dec. 4, 2014

(51) Int. Cl.
*F01D 5/18*      (2006.01)
*B23P 15/02*     (2006.01)

(52) U.S. Cl.
CPC ............. *F01D 5/186* (2013.01); *B23P 15/02* (2013.01); *F05D 2230/10* (2013.01);
(Continued)

(58) Field of Classification Search
CPC .... F01D 5/186; F01D 5/187; F05D 2240/303; F05D 2240/305; F05D 2240/306; Y02T 50/676; Y10T 29/49341
(Continued)

(56) References Cited

U.S. PATENT DOCUMENTS 5,370,499 A    12/1994   Lee
5,779,437 A     7/1998   Abdel-Messeh et al.
(Continued)

FOREIGN PATENT DOCUMENTS

EP        EP 0924384 A2 *   6/1999  ............. F01D 5/187

OTHER PUBLICATIONS

EP Examination Report for Application No. 14164298.3 dated Nov. 7, 2014.
(Continued)

*Primary Examiner* — Igor Kershteyn
*Assistant Examiner* — Christopher R Legendre
(74) *Attorney, Agent, or Firm* — Ingrassia Fisher & Lorenz, P.C.

(57) ABSTRACT

Turbine blade airfoils, film cooling systems thereof, and methods for forming improved film cooled components are provided. The turbine blade airfoil has an external wall surface and comprises leading and trailing edges, pressure and suction sidewalls both extending between the leading and the trailing edges, an internal cavity, one or more isolation trenches in the external wall surface, a plurality of film cooling holes arranged in cooling rows, and a plurality of span-wise surface connectors interconnecting the outlets of the film cooling holes in the same cooling row to form a plurality of rows of interconnected film cooling holes. Each film cooling hole has an inlet connected to the internal cavity and an outlet opening onto the external wall surface. The span-wise surface connectors in at least one selected row of interconnected film cooling holes are disposed in the one or more isolation trenches.

20 Claims, 8 Drawing Sheets

(52) U.S. Cl.
CPC .. *F05D 2240/303* (2013.01); *F05D 2240/305* (2013.01); *F05D 2240/306* (2013.01); *Y02T 50/676* (2013.01); *Y10T 29/49341* (2015.01)

(58) Field of Classification Search
USPC .............................................. 416/96 R, 97 R
See application file for complete search history.

(56) References Cited

U.S. PATENT DOCUMENTS

| | | | |
|---|---|---|---|
| 6,050,777 A * | 4/2000 | Tabbita ................ | F01D 5/186 29/889.721 |
| 6,099,251 A * | 8/2000 | LaFleur ................ | F01D 5/147 415/115 |
| 6,176,676 B1 | 1/2001 | Ikeda et al. | |
| 6,955,522 B2 * | 10/2005 | Cunha ................ | F01D 5/186 415/115 |
| 6,994,521 B2 | 2/2006 | Liang | |
| 7,114,923 B2 | 10/2006 | Liang | |
| 7,300,252 B2 | 11/2007 | Liang | |
| 7,500,823 B2 | 3/2009 | Bolms et al. | |
| 7,540,712 B1 | 6/2009 | Liang | |
| 7,597,540 B1 | 10/2009 | Liang | |
| 7,665,961 B2 | 2/2010 | Lutjen et al. | |
| 7,722,327 B1 | 5/2010 | Liang | |
| 7,789,626 B1 | 9/2010 | Liang | |
| 7,878,761 B1 | 2/2011 | Liang | |
| 8,052,390 B1 | 11/2011 | Liang | |
| 8,105,030 B2 * | 1/2012 | Abdel-Messeh ........ | F01D 5/187 415/115 |
| 8,172,505 B2 | 5/2012 | Fujimoto et al. | |
| 8,317,473 B1 | 11/2012 | Liang | |
| 9,228,440 B2 * | 1/2016 | Kollati .................... | F01D 5/186 |
| 2008/0095622 A1 | 4/2008 | Naik et al. | |
| 2012/0027619 A1 | 2/2012 | Albert et al. | |
| 2014/0154096 A1 * | 6/2014 | Kollati .................... | F01D 5/186 416/97 R |
| 2014/0356188 A1 * | 12/2014 | Kollati .................... | B23P 15/02 416/97 A |
| 2015/0322801 A1 * | 11/2015 | Slavens ..................... | F01D 5/18 415/115 |
| 2016/0017736 A1 * | 1/2016 | Jenkinson ............... | F23R 3/002 415/115 |

OTHER PUBLICATIONS

Garg, V. K.: "Heat transfer research on gas turbine airfoils at NASA GRC" International Journal of Heat and Fluid Flow, vol. 23, Issue 2, pp. 109-136 (Apr. 2002).
USPTO Office Action for U.S. Appl. No. 13/692,353 Notification Date May 7, 2015.
EP Search Report for Application No. 14164298.3 dated Oct. 24, 2014.

* cited by examiner

TURBINE BLADE AIRFOILS INCLUDING FILM COOLING SYSTEMS, AND METHODS FOR FORMING AN IMPROVED FILM COOLED AIRFOIL OF A TURBINE BLADE

TECHNICAL FIELD

The present invention generally relates to gas turbine engines and methods for film cooling of components thereof, and more particularly relates to turbine blade airfoils including film cooling systems, and methods for forming an improved film cooled component, such as the airfoil of a turbine blade.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon blades of a turbine rotor. A rotatable turbine disk or wheel, from which the turbine blades extend, spins at high speeds to produce power. Gas turbine engines used in aircraft use the gas turbine aft end to produce a forward thrust. Other gas turbine engines may use the power to turn a propeller or an electrical generator.

One way to increase cycle efficiency of a gas turbine is to operate at higher turbine inlet temperature (TIT). In most engines, the turbine inlet temperatures have increased well above the metallurgical limit of engine components. Film cooling of gas turbine components (blades and vanes) is a widely used technique that allows higher turbine inlet temperatures by maintaining material temperatures within acceptable limits. With film cooling, air is extracted from the compressor and forced through internal cooling passages within turbine blades and vanes before being ejected through discrete film cooling holes onto the external wall surfaces of the airfoil. The cooling air leaving these film cooling holes forms a film layer of cooling air on the component surface which protects the component from hot gas exiting the combustor by substantially reducing heat transfer from the hot gas to the blade skin as the cooling air is at a lower temperature than the hot gas. Although the aforementioned film cooling systems operate adequately, they may be improved. For example, in the airfoil leading edge region, at lower blowing ratios, the cooling air (also known herein as "coolant") can get carried away by the accelerating mainstream flow of hot gas due to lower coolant radial momentum. At higher blowing ratios, the cooling film may blow-off from the leading edge external wall surface, both scenarios substantially impeding formation of the film layer of cooling air against the airfoil external wall surface, resulting in lower cooling effectiveness.

Accordingly, it is desirable to provide improved film cooled components such as turbine blade airfoils, film cooling systems, and methods for forming an improved film cooled component, such as the airfoil of a turbine blade. The improved film cooling systems may effectively cool components that are typically subjected to elevated operating temperatures, such as those above about 1100° C. In addition, it is desirable for the film cooling systems to provide better film cooling. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Airfoils of a turbine blade are provided. The airfoil has an external wall surface. In accordance with one exemplary embodiment, the airfoil comprises a leading edge and a trailing edge, a pressure sidewall and a suction sidewall both extending between the leading and the trailing edges, an internal cavity, one or more isolation trenches in the external wall surface, a plurality of film cooling holes arranged in cooling rows, and a plurality of span-wise surface connectors interconnecting the outlets of the film cooling holes in the same cooling row to form a plurality of rows of interconnected film cooling holes. Each film cooling hole has an inlet connected to the internal cavity and an outlet opening onto the external wall surface. The span-wise surface connectors in at least one selected row of interconnected film cooling holes are disposed in the one or more isolation trenches.

Film cooling systems are provided for cooling a component having an external wall surface to be cooled in accordance with yet another exemplary embodiment of the present invention. The system comprises one or more isolation trenches in the external wall surface, a plurality of film cooling holes in the component, and a plurality of span-wise surface connectors. The film cooling holes are arranged in cooling rows. The span-wise surface connectors interconnect sequential outlets of the film cooling holes in the same cooling row to form a plurality of rows of interconnected film cooling holes. Each film cooling hole has an inlet configured to receive cooling air and an outlet, the outlet opening onto the external wall surface. At least one selected row of interconnected film cooling holes is disposed in the one or more isolation trenches.

Methods for forming an improved film cooled component having an external wall surface are also provided in accordance with another exemplary embodiment of the present invention. The method comprises forming one or more isolation trenches in the external wall surface. A plurality of film cooling holes is formed in the external wall surface and arranged in cooling rows. Each film cooling hole has an inlet connected to a source of coolant and an outlet opening onto the external wall surface. A plurality of span-wise surface connectors is formed in the external wall surface for interconnecting the outlets of the film cooling holes within the same cooling row to form a plurality of rows of interconnected film cooling holes. The span-wise surface connectors in at least one selected row of interconnected film cooling holes are disposed in the one or more isolation trenches.

Furthermore, other desirable features and characteristics of the turbine blade airfoil, the film cooling system, and method for forming an improved film cooled component will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to film cooled components such as a turbine blade airfoil, film cooling systems, and methods for forming an improved film cooled component, such as an airfoil of a turbine blade. While this invention is being described showing a particular configured turbine blade as being the preferred embodiment, as one skilled in this art will appreciate, the principles of the present invention can be applied to other film cooled components that are exposed to a hot gas flow. For example, gas turbine engine components such as stator vanes, rotor blades, etc., may be film cooled, such as by showerhead film cooling as hereinafter described. Components other than gas turbine engine components may also be film cooled. The film cooling systems according to exemplary embodiments may be used to provide better cooling of surfaces (e.g., the turbine blade skin) exposed to the hot gas flow and with less coolant by helping to retain the cooling air radial momentum (i.e., the velocity at which the cooling air is ejected out from a film cooling hole outlet onto an external wall surface) to allow formation of a cooling film layer against the airfoil external wall surface regardless of the blowing ratio, by substantially preventing blow-off (i.e., separation of the cooling film from the external wall surface), and by temporarily isolating the ejected cooling air from the main hot gas flow, to provide for a more uniform, longer lasting coolant film layer on the surfaces exposed to the hot gas flow. As used herein, the term "blowing ratio", M, is the ratio of the coolant mass flux to the mainstream gas mass flux and is defined as follows: $M=P_c U_c/P_m U_m$, where $P_c$ and $P_m$ are the coolant and mainstream density, respectively, and $U_c$ and $U_m$ are the coolant and mainstream velocity, respectively.

Figure 1:
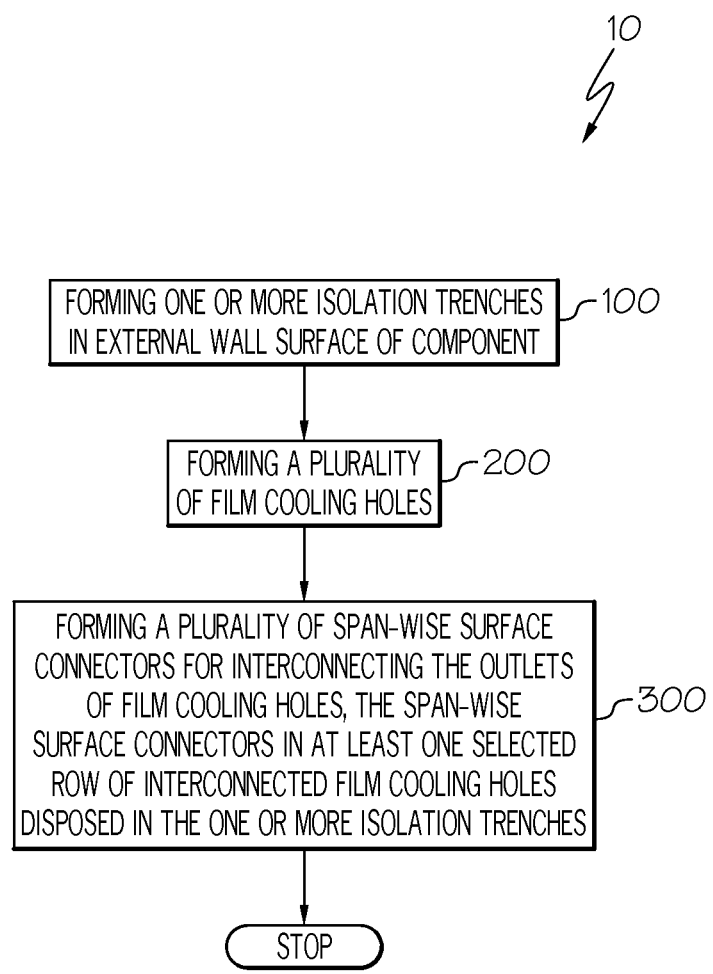
FIG. 1 is a flow diagram of a method for forming an improved film cooled component, such as an airfoil of a turbine blade, according to an exemplary embodiment of the present invention.
Figure 2:
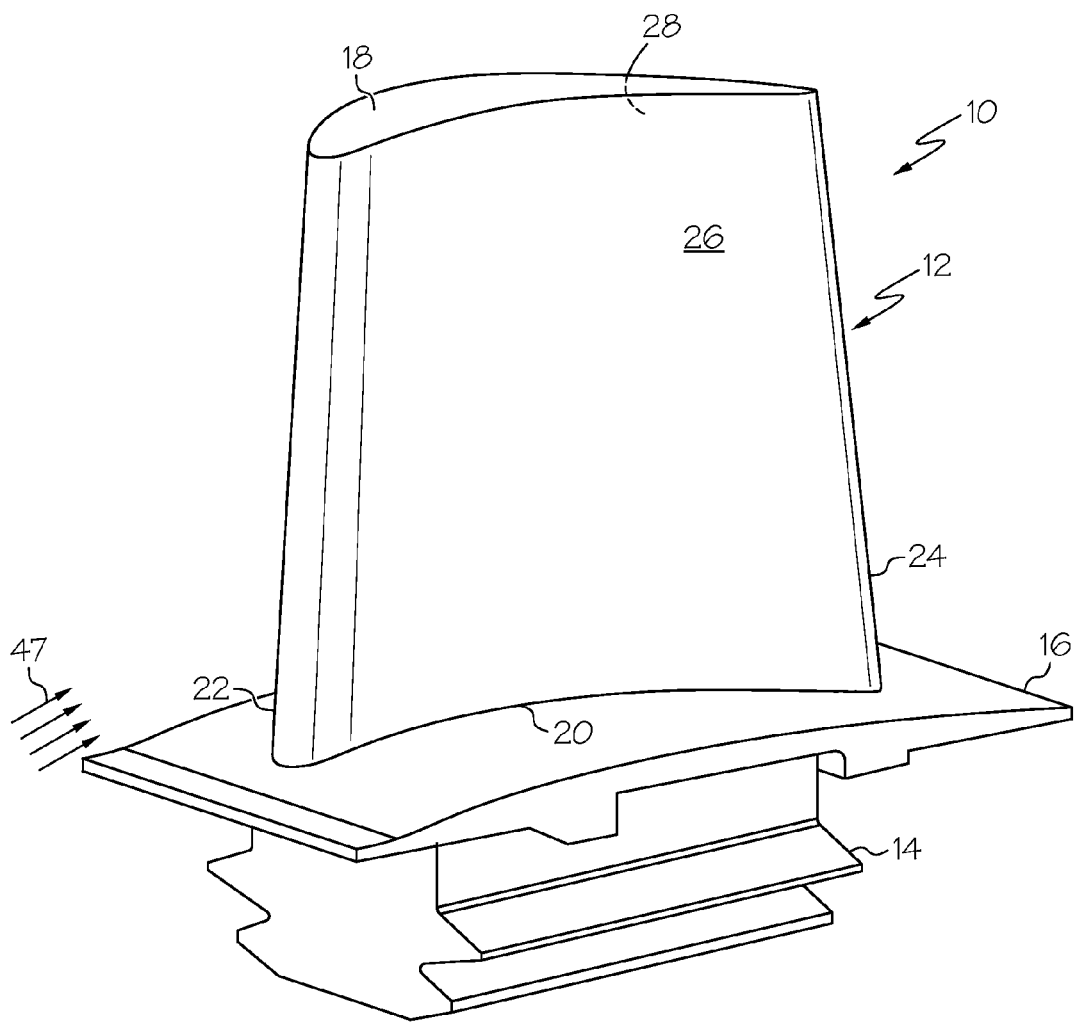
FIG. 2 is an isometric view of an exemplary prior art turbine blade.
Figure 3:
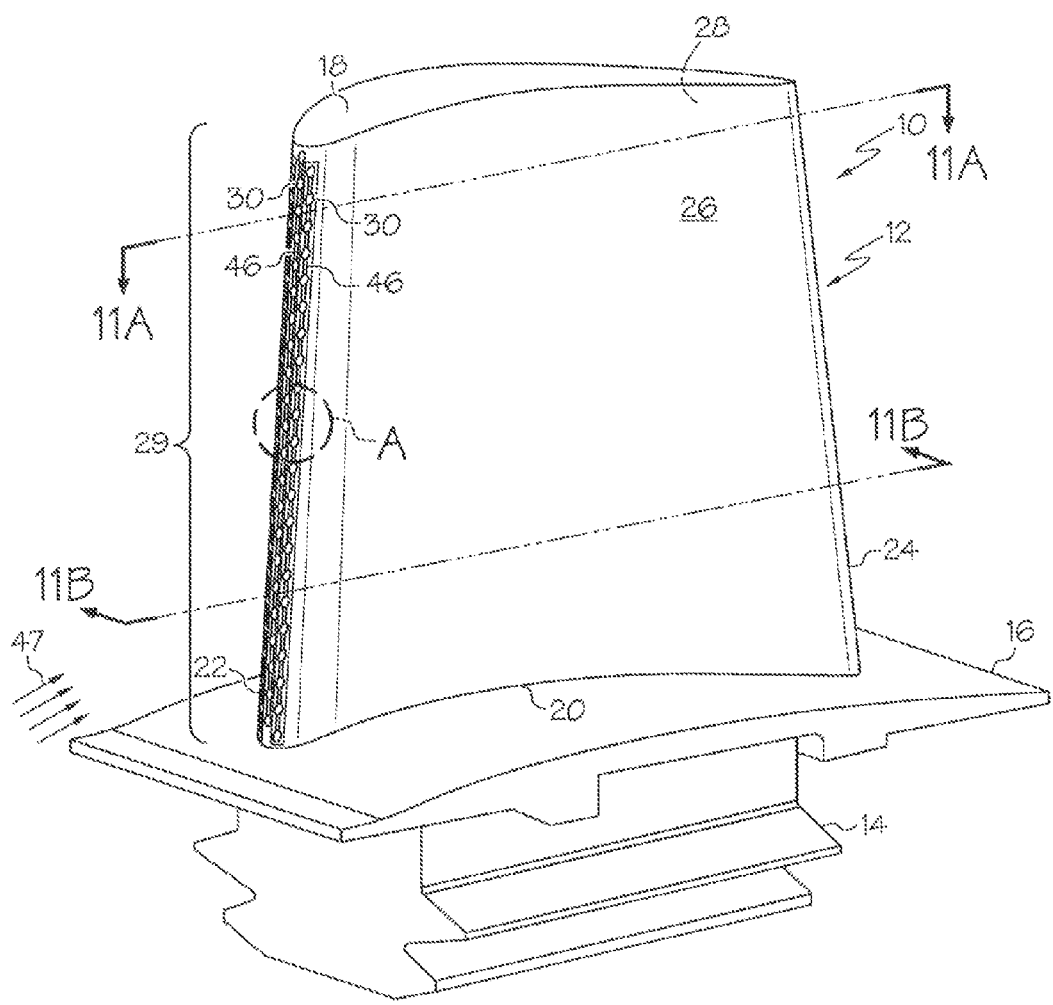
FIG. 3 is an isometric view of an exemplary turbine blade including an improved showerhead film cooled airfoil, according to an exemplary embodiment of the present invention.

Referring to FIGS. 1 through 3, according to exemplary embodiments, a method 10 for forming an improved film cooled component (exemplified by the showerhead film cooled airfoil of the turbine blade illustrated in FIG. 3 for use in a gas turbine engine (not shown)) begins by forming one or more isolation trenches 41 (shown best in FIGS. 5 and 6) in an external wall surface 44 of a component (step 100). The component may be commercially available (such as the conventional turbine blade 10 of FIG. 2). Alternatively, the step of forming the one or more isolation trenches 41 may be performed during component manufacturing. The exemplary turbine blade of FIGS. 2 and 3 comprises an airfoil 12 and a fir-tree attachment 14 including a platform 16. The airfoil 12 includes a tip 18, a root 20, a leading edge 22, a trailing edge 24, a pressure sidewall 26 and a suction sidewall 28 both extending between the leading edge and the trailing edge.

Figure 4:
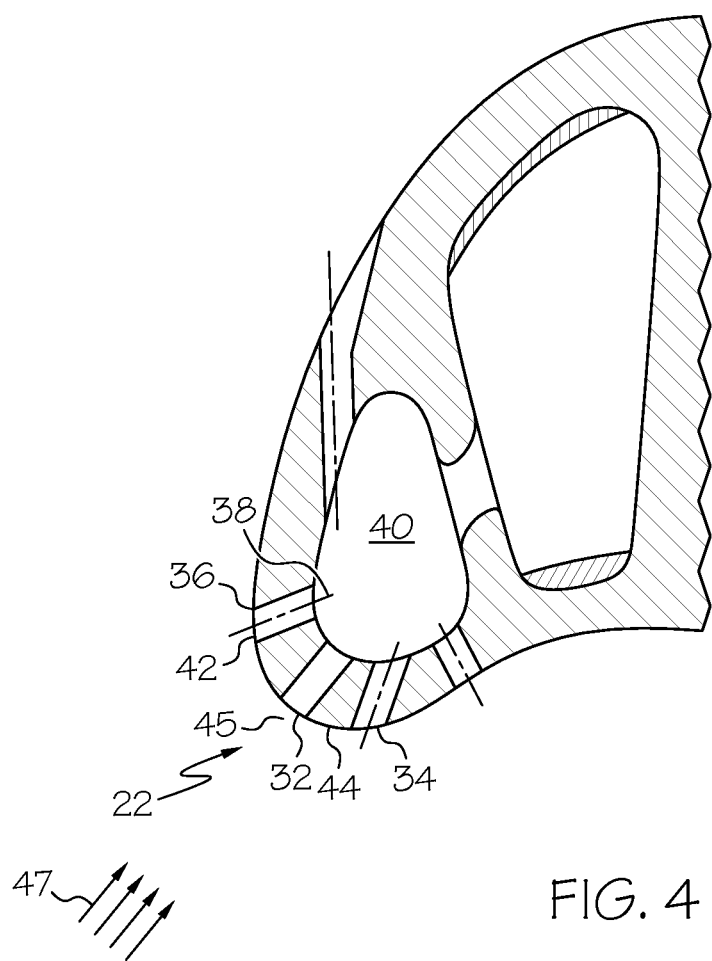
FIG. 4 is a cross sectional top view of the airfoil leading edge of the turbine blade of FIG. 3.
Figure 5:
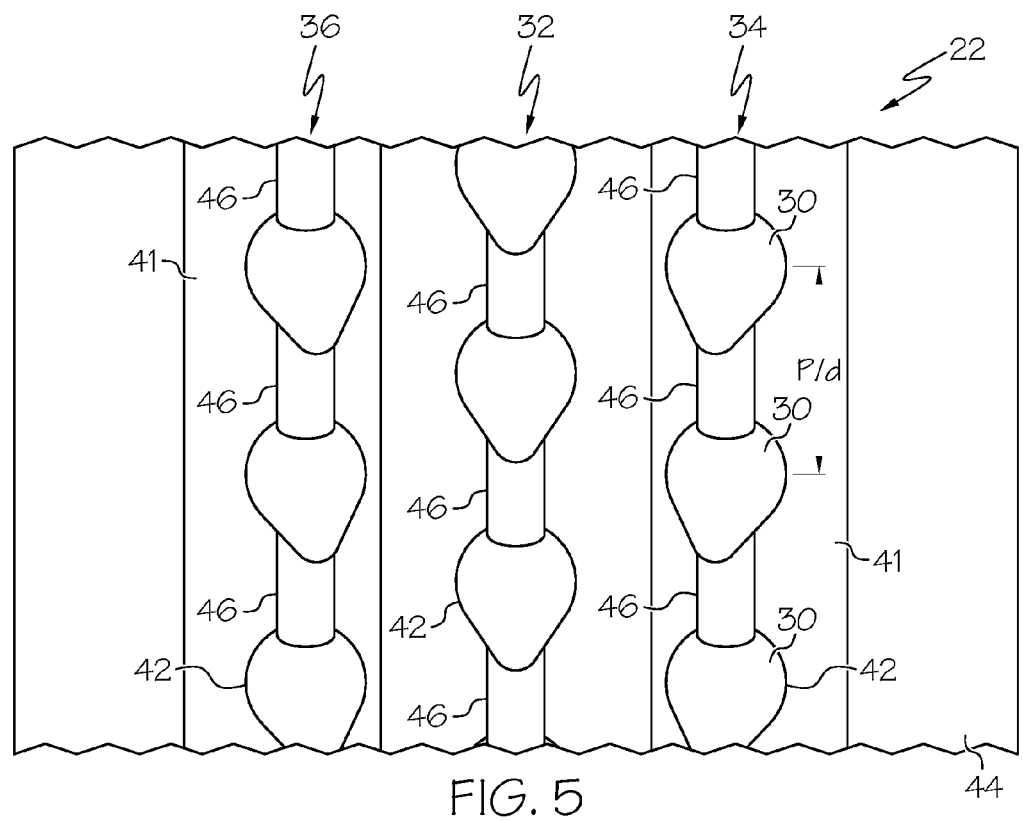
FIG. 5 is an enlarged front (outside) view of encircled region A of the improved showerhead film cooled airfoil of FIG. 3, illustrating a portion of the showerhead of film cooling holes, each film cooling hole having an outlet opening onto an external wall surface of the airfoil, the outlets of film cooling holes in the same cooling row interconnected by a plurality of span-wise surface connectors, the plurality of span-wise surface connectors in at least one selected row of the interconnected film cooling holes disposed in (i.e., superimposed over) one or more isolation trenches in the external wall surface, according to exemplary embodiments of the present invention.
Figure 6:
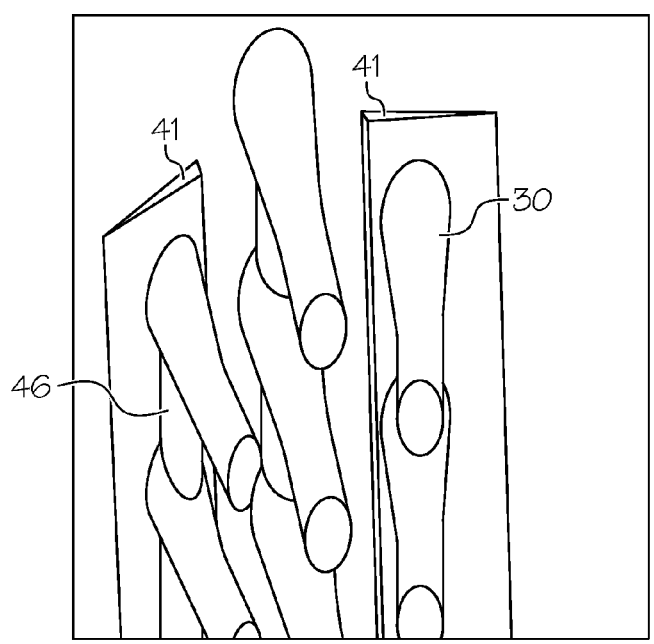
FIG. 6 is an enlarged rear (inside) view of encircled region A of the improved showerhead film cooled airfoil of FIG. 5.

Still referring to FIGS. 3 and 5 through 6, the one or more isolation trenches 41 may comprise a portion of the external wall surface. As used herein, the term "isolation trench" refers to an elongated radially-extending groove or depression in the external wall surface of the airfoil. As illustrated, the isolation trench may be integrally formed in the leading edge blade material of the airfoil in the pressure sidewall, or in the leading edge blade material of the airfoil in the pressure sidewall and in the suction sidewall. The isolation trench is spaced apart from a geometric stagnation line 45 (FIG. 4) of the leading edge, for purposes as hereinafter described. The isolation trench may be formed wherever a row of film cooling holes is to be provided as hereinafter described, such as at the airfoil leading edge as illustrated and/or on the airfoil pressure and/or suction sidewalls at other than the leading edge. The one or more isolation trenches extend from the root of the blade toward the tip 18 (i.e., in the "span-wise direction"). The isolation trench has a shape conforming to the local curvature of the airfoil surface. For example, the isolation trench may be wedge-shaped such that the depth thereof decreases in a downstream direction. The width, length, and depth of the isolation trench depend upon the diameter of the film cooling holes and number of cooling rows as hereinafter described and other design needs as determined by those skilled in the art. For example, the depth of a trench may be about ¼ to about 1½ of the diameter of the film cooling hole(s). The trench width for a single row of film cooling holes may be about 2 to about 5 of the diameter of the film cooling hole(s), and about 4 to about 10 for two rows of film cooling holes. The isolation trench may be formed over the length of an entire row of film cooling holes. The width, length, and depth of the isolation trench may vary from the examples provided above. The isolation trench generally follows the curvature of the leading edge. The isolation trench may be integrally cast into the airfoil blade material during a manufacturing process for the turbine blade. The isolation trench may alternatively be formed by machining the isolation trench into the blade material. While the methods described herein for forming the isolation trenches involve casting and/or machining, it is to be understood that other isolation trench-forming methods may be used.

Referring again to FIG. 1 and still referring to FIGS. 5 through 6, according to exemplary embodiments, method 10 for forming an improved film cooled component (as exemplified by the airfoil of turbine blade 10 of FIG. 3) continues by forming a plurality of film cooling holes 30 in the component (step 200), such as in exemplary turbine blade 10 (FIG. 2). The plurality of film cooling holes may be arranged in a showerhead 29 arrangement (referred to simply as a "showerhead" as known in the art). The showerhead of film cooling holes 30 is shown in the leading edge of the airfoil in FIGS. 3 and 5. The showerhead 29 comprises a plurality of film cooling holes 30 forming an array of at least three rows 32, 34, and 36 (FIG. 5) (also referred to herein as "cooling rows") disposed about the airfoil leading edge 22. Each film cooling hole 30 has an inlet 38 connected to an internal cavity 40 (FIG. 4) that supplies cooling air, and an outlet 42 opening onto the external wall surface 44 at the leading edge of the airfoil 12.

Still referring to FIGS. 3 and 5, the first cooling row 32 comprises a first plurality of film cooling holes extending in a span-wise direction of the airfoil and is located substantially along the geometric stagnation line 45 of the leading edge (FIG. 4). The first row will directly face the mainstream flow of hot gas 47, as illustrated in FIG. 4. A second row 34 comprising a second plurality of film cooling holes extends in a span-wise direction of the airfoil and on the pressure side of the stagnation line at the leading edge; a third row 36 of a third plurality of film cooling holes extends in a span-wise direction of the airfoil and on the suction side of the stagnation line at the leading edge. The rows 32, 34, and 36 of film cooling holes extend from the root of the blade toward the tip 18 (FIG. 3) (i.e., in the "span-wise direction"). The outlets of film cooling holes in the second and third rows of film cooling holes are illustrated as opening onto the external wall surface 44 at the location(s) of the at least one isolation trench formed in step 100, according to exemplary embodiments, as hereinafter described. The film cooling holes are arranged symmetrically with respect to a mainstream gas flow 47 (FIGS. 3 and 4), at circumferential positions 0°, −30 to −15°, and 15 to 30°, and a hole spacing of p/d=2 to 10 in the span-wise direction. As used herein, p=the pitch (linear dimension) from the film cooling hole centerline to the sequential film cooling hole centerline (in the same row) and d=the diameter of the film cooling hole.

The film cooling holes of all three rows are oriented substantially perpendicular to the mainstream gas flow 47 and with a significant radial component (45° or more) comprising the hot gas exiting the combustor (not shown) of the gas turbine engine (not shown). Each of rows 34 and 36 is staggered in the span-wise direction relative to row 32 and horizontally aligned with respect to each other. It is to be understood that rows may be staggered in other relationships and may also or alternatively be aligned relative to other rows. While a showerhead of film cooling holes has been described, it is to be understood that the film cooling holes may be arranged in other than a showerhead 29 within the context of the present invention.

Figure 7A:
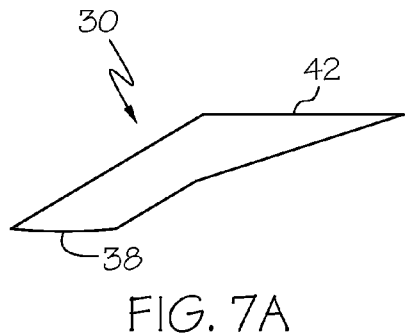
FIGS. 7A and 7B are isometric views of an exemplary diffusive film cooling hole.
Figure 7B:
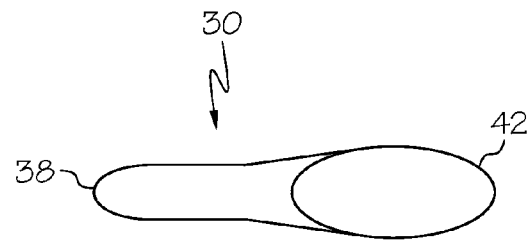
Figure 8:
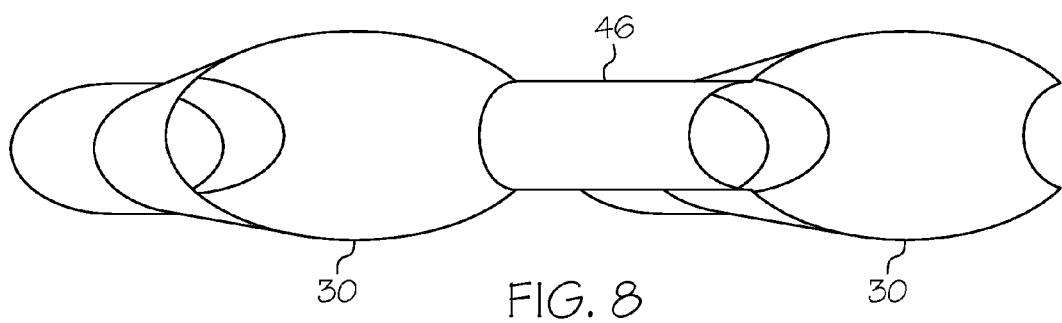
FIGS. 8 through 10 are each isolation (isometric) views illustrating a span-wise connector extending between the outlets of a pair of sequential exemplary diffusive cooling holes in a single cooling row of diffusive film cooling holes (the complete row is not shown in the figures)
Figure 9:
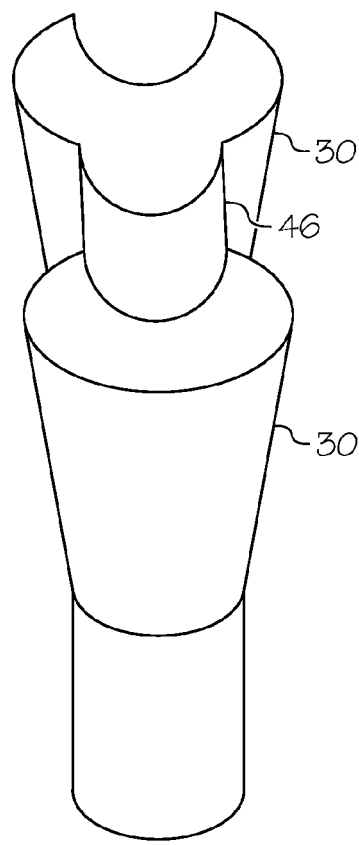
Figure 10:
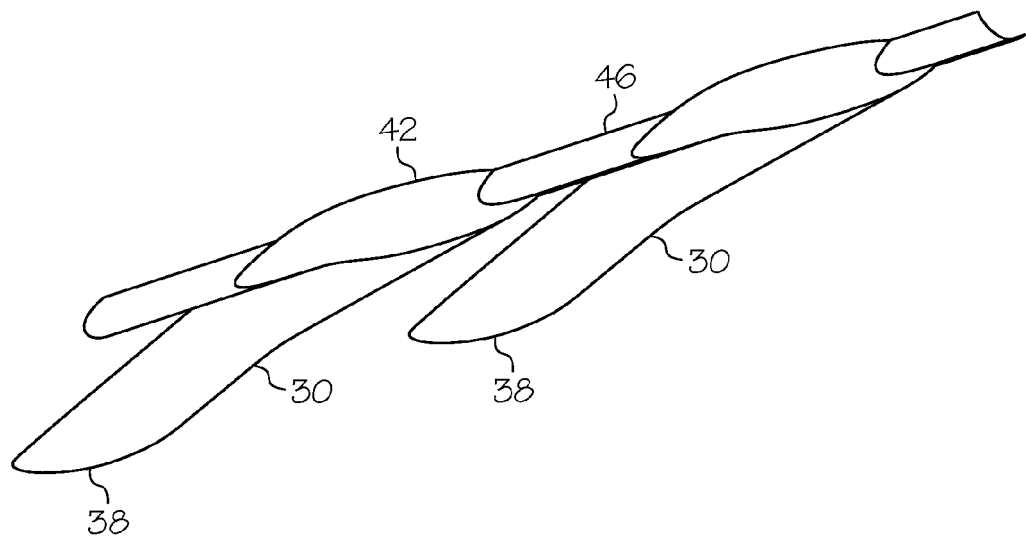

The film cooling holes may comprise cylindrical film cooling holes (not shown), diffusive film cooling holes (such as shown in FIGS. 7A and 7B), combinations of cylindrical film cooling holes, diffusive film cooling holes, and film cooling holes of other shapes, geometries, and configurations as known in the art. FIGS. 7A through 7B illustrate exemplary diffusive film cooling holes comprising a cylindrical portion with a flared diffuser section at the outlet 42 or discharge thereof. While specific showerhead and film cooling hole geometries and configurations have been described, it is to be understood that the exemplary embodiments as hereinafter described are not limited to any particular showerhead and film cooling hole geometries and/or configurations. For example, the film cooling hole shape, dimensions, injection and/or compound angle, the hole spacing (p/d) (FIG. 5) between film cooling holes, the spacing between rows of film cooling holes, the number of rows, or the like may be varied depending upon the particular application. The array of rows may also be in other patterns predicated on the particular engine application. In addition, as noted previously, while cooling at the leading edge external wall surface has been described, it is to be understood that film cooling holes may be disposed at other than the leading edge for film cooling thereat. For example, film cooling holes may be disposed in the pressure and suction sidewalls away from the leading edge.

The outlets of the film cooling holes in the same cooling row are interconnected by span-wise connectors 46 forming a row of interconnected film cooling holes, as hereinafter described. For example, the film cooling holes in the first row 32 interconnected by span-wise connectors 46 is referred to herein as "a first row 32 of interconnected film cooling holes." The second and third rows 34 and 36 of film cooling holes interconnected by span-wise surface connectors are similarly referred to respectively herein as "a second row 34 of interconnected film cooling holes" and a "third row 36 of interconnected film cooling holes."

Referring again to FIGS. 1, 3, and 5, according to exemplary embodiments, the method 10 for forming an improved film cooled component continues by forming the plurality of span-wise surface connectors 46 to interconnect the outlets of the film cooling holes in the same cooling row, the span-wise surface connectors in at least one selected row of interconnected film cooling holes being formed in the one or more isolation trenches (step 300). While steps 100, 200, and 300 have been described as being performed in a particular order, it is to be understood that the steps may be performed in any order.

FIG. 5 is an enlarged view of the encircled region A (a portion of the airfoil leading edge 22) of FIG. 3, with the film cooling holes 30 opening onto the external wall surface 44 with the plurality of span-wise surface connectors 46 interconnecting the outlets 42 of sequential pairs of diffusive film cooling holes in the same cooling row in the span-wise direction. Each surface connector extends between the outlets 42 of a selected pair of film cooling holes 30 for coolant flow therebetween. While the span-wise surface connectors are illustrated as interconnecting the outlets of diffusive film cooling holes 30, it is to be understood that the plurality of surface connectors may interconnect the outlets of film cooling holes of other shapes. As illustrated in FIGS. 5 and 8 through 10, each of the span-wise connectors 46 has a first end to be disposed at the outlet of a film cooling hole and a second end to be disposed at the outlet of a sequential film cooling hole in the same row, i.e., each span-wise surface connector extends in a span-wise direction (i.e., in a radial direction) between a pair of outlets 42 of sequential film cooling holes within the same cooling row.

Each span-wise surface connector comprises a groove or channel integrally formed in the blade material on the external wall surface 44 of the airfoil. The plurality of span-wise surface connectors may be integrally cast into the airfoil during a casting process for the turbine blade. The surface connectors may alternatively be formed by machining them into the blade material. The blade material may be airfoil leading edge blade material. While the methods described herein for forming the connectors involve machining and/or casting, it is to be understood that other surface connector-forming methods may be used. The depth (D) of each surface connector is about 0.25 to about 0.5 of the diameter (d) of the film cooling hole, but other diameter (d) to depth (D) ratios (d/D) may be used.

As noted previously, according to exemplary embodiments, the span-wise surface connectors in at least one selected row of interconnected film cooling holes may be formed in the airfoil blade material (leading edge or otherwise) in the one or more isolation trenches such that the span-wise surface connectors in the selected rows are superimposed on the one or more isolation trenches. For example, FIG. 5 illustrates the span-wise surface connectors of the second row 34 of interconnected film cooling holes disposed in (i.e., superimposed on) a corresponding isolation trench and the span-wise surface connectors of the third row 36 of interconnected film cooling holes disposed in a corresponding isolation trench. At a minimum, the span-wise surface connectors of the second row 34 (i.e., on pressure sidewall) of interconnected film cooling holes are disposed in a corresponding isolation trench. As the first row of interconnected film cooling holes directly faces the mainstream hot gas flow 47 (FIG. 4), the span-wise surface connectors thereof are not disposed in an isolation trench and therefore first row is not a "selected row." While there may be a 1:1 correspondence between the number of selected rows of interconnected film cooling holes and the number of isolation trenches as illustrated, it is to be understood that a 1:1 correspondence is unnecessary. For example, span-wise surface connectors in more than a single selected row of interconnected film cooling holes may be disposed in a single isolation trench. As used herein, the term "superimposed" refers to the span-wise connectors overlying the at least one isolation trench. Each isolation trench extends lengthwise, widthwise, and depthwise beyond the corresponding row of interconnected film cooling holes, i.e., each isolation trench is longer, wider, and deeper than the footprint of the corresponding selected row of interconnected film cooling holes.

Figure 11A:
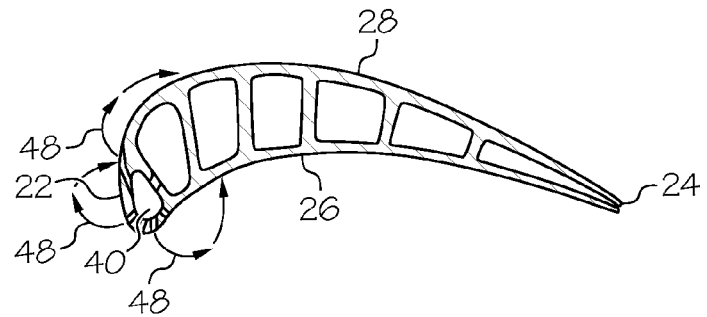
FIG. 11A is a sectional view of the turbine blade of FIG. 3 taken along line 11A-11A of FIG. 3
Figure 11B:
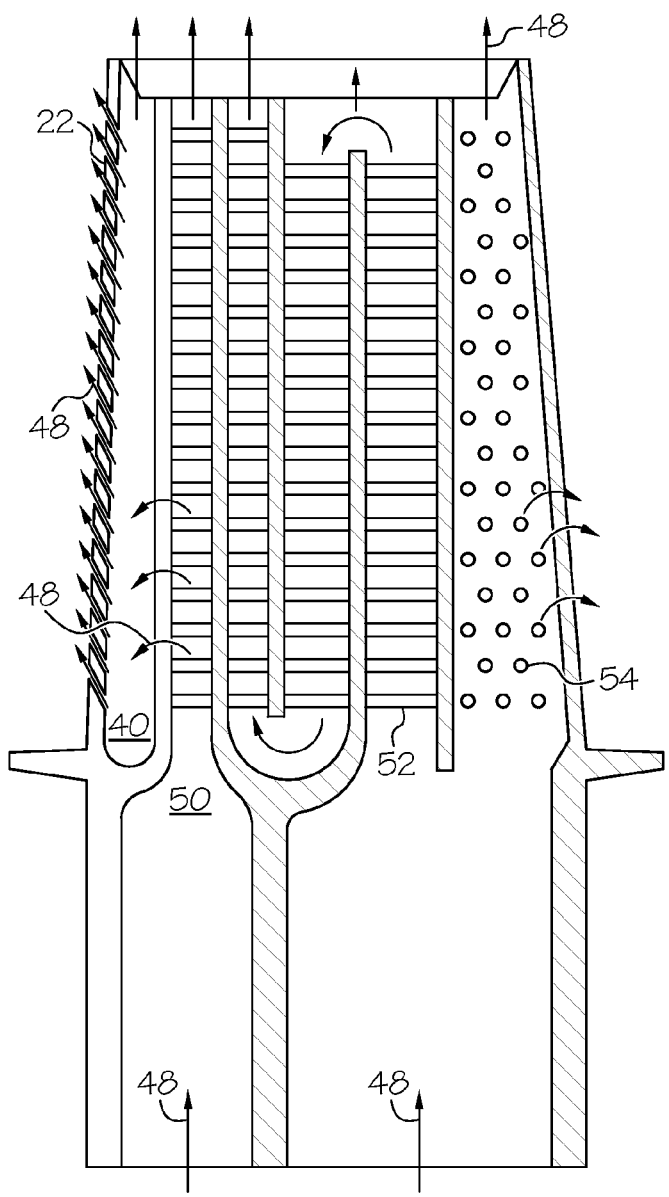
FIG. 11B is a sectional view thereof taken along line 11B-11B of FIG. 3 illustrating a coolant flowpath.

In operation, cooling air 48 is supplied through the internal cavity of the turbine blade and flows into the showerhead film cooling system 29 (FIGS. 11A and 11B). The cooling air 48 is supplied through the showerhead of film cooling holes at the airfoil leading edge which is then discharged into the plurality of span-wise surface connectors 46. The cooling air flowing in the selected rows of interconnected film cooling holes then spreads radially into the one or more isolation trenches, forming a film layer of cooling air on the external wall surface 44 at the leading edge 22 of the airfoil. The cooling air from each outlet in the same cooling row is discharged in the corresponding isolation trench. As known in the art, the cooling air 48 may be supplied to the internal cavity 40 from a passage 50 formed in the bottom of the fir tree attachment and as is typical in many turbine cooling installations, the coolant may be supplied by the engine compressor (not shown). There may be turbulence promoters 52 and pin fins 54 in the coolant flowpath through the turbine blade.

EXAMPLES

The examples are provided for illustration purposes only, and are not meant to limit the various embodiments of the present invention in any way. The improvement in area averaged cooling effectiveness of the leading edge and overall blade surface in the improved showerhead film cooled airfoil of the turbine using the showerhead film cooling system with cylindrical film cooling holes interconnected with span-wise surface connectors superimposed on isolation trenches (referred to in Table 1 as "connectors on a trench") according to exemplary embodiments over a conventional showerhead film cooling system having discrete (i.e., no surface connectors and no isolation trenches) cylindrical film cooling holes ("baseline cylindrical") is shown in Table 1 below for varying blowing ratios (BR):

TABLE 1

| | | Area averaged effectiveness | | % improvement |
|---|---|---|---|---|
| | BR | baseline cylindrical | connectors on a trench | connectors on a trench |
| leadingsurf | 1.0 | 0.256 | 0.374 | 45.7 |
| | 2.0 | 0.139 | 0.467 | 234.7 |
| | 3.0 | 0.151 | 0.498 | 230.3 |
| | 4.0 | 0.251 | 0.577 | 130.0 |
| overall blade | 1.0 | 0.088 | 0.098 | 10.9 |
| | 2.0 | 0.111 | 0.152 | 37.9 |
| | 3.0 | 0.138 | 0.185 | 34.5 |
| | 4.0 | 0.181 | 0.220 | 21.4 |

The improvement in area averaged cooling effectiveness of the leading edge and the overall airfoil using the showerhead film cooling system with interconnected diffusive film cooling holes according to exemplary embodiments over a conventional showerhead film cooling system having discrete (i.e., no surface connectors and no isolation trenches) diffusive film cooling holes ("baseline diffusive") is shown in Table 2 below for varying blowing ratios:

TABLE 2

| | | Area averaged effectiveness | | % improvement |
|---|---|---|---|---|
| | BR | baseline diffusive | connectors on a trench | connectors on a trench |
| leadingsurf | 1.0 | 0.336 | 0.510 | 52.0 |
| | 2.0 | 0.480 | 0.687 | 43.3 |
| | 3.0 | 0.611 | 0.740 | 21.1 |
| | 4.0 | 0.675 | 0.769 | 13.9 |
| overall blade | 1.0 | 0.095 | 0.109 | 15.0 |
| | 2.0 | 0.160 | 0.176 | 10.5 |
| | 3.0 | 0.209 | 0.218 | 4.4 |
| | 4.0 | 0.241 | 0.242 | 0.5 |

From the foregoing, it is to be appreciated that improved film cooled components including showerhead film cooled components such as turbine blade airfoils, film cooling systems, and methods for forming the improved film cooled airfoil of the turbine blade have been provided. The plurality of span-wise surface connectors cooperate with the corresponding isolation trench(es) to help retain the coolant radial (span-wise) momentum, thereby improving cooling effectiveness at lower blowing ratios and substantially preventing blow-off at the leading edge external wall surface at higher blowing ratios. The isolation trenches temporarily isolate coolant flow from the main hot gas flow 47, thereby prolonging blade exposure to the coolant as the ejected coolant has more time to spread radially on the external wall surface before interacting with the mainstream hot gas flow. Thus, a more uniform, longer-lasting coolant film is maintained against the external wall surface for a longer duration than possible without the span-wise surface connectors and isolation trenches, thereby providing better film cooling. Film cooling of the airfoil leading edge and overall airfoil is improved. In addition, as noted previously, while cooling at the leading edge external wall surface has been described, it is to be understood that span-wise surface connectors and isolation trench(es) disposed at other than the leading edge (and spaced apart from the geometric stagnation line 45) may be used to retain coolant radial momentum and prolong coolant film formation in additional areas, thereby further increasing overall component cooling, including overall airfoil cooling, permitting higher turbine inlet temperatures and longer turbine blade life.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil of a turbine blade, the airfoil having an external wall surface and comprising:
    a leading edge and a trailing edge;
    a pressure sidewall and a suction sidewall both extending between the leading and the trailing edges;
    an internal cavity;
    one or more isolation trenches in the external wall surface;
    a plurality of film cooling holes arranged in cooling rows, each film cooling hole having an inlet connected to the internal cavity and an outlet opening onto the external wall surface; and
    a plurality of span-wise surface connectors interconnecting only the outlets of the film cooling holes in the same cooling row to form a plurality of rows of interconnected film cooling holes, wherein the span-wise surface connectors in at least one selected row of interconnected film cooling holes are defined in one of the one or more isolation trenches, and the one of the one or more isolation trenches is formed over a length of the at least one selected row of interconnected film cooling holes.

2. The airfoil of claim 1, wherein the plurality of rows of interconnected film cooling rows comprises at least three rows of interconnected film cooling holes, a first row of the at least three rows of interconnected film cooling holes comprising a first plurality of interconnected film cooling holes extending in a span-wise direction of the airfoil and located substantially along a stagnation line of the leading edge, the at least three rows of interconnected film cooling holes further comprising:
    a second row comprising a second plurality of interconnected film cooling holes extending in a span-wise direction of the airfoil and in the pressure sidewall at the leading edge; and
    a third row comprising a third plurality of interconnected film cooling holes extending in a span-wise direction of the airfoil and in the suction sidewall at the leading edge, wherein the plurality of span-wise surface connectors interconnecting only the outlets of the film cooling holes in at least the second row are defined in the one or more isolation trenches.

3. The airfoil of claim 2, wherein the plurality of span-wise connectors interconnecting only the outlets of the film cooling holes in the second and third rows are defined in the one or more isolation trenches.

4. The airfoil of claim 1, wherein each span-wise connector extends in a span-wise direction only between a pair of outlets of sequential film cooling holes within the same cooling row.

5. The airfoil of claim 1, wherein the at least one isolation trench comprises a wedge-shaped groove having a depth that decreases in a downstream direction.

6. The airfoil of claim 1, wherein the plurality of span-wise surface connectors interconnecting only the outlets of the film cooling holes in a single selected cooling row are defined in a single isolation trench.

7. The airfoil of claim 1, wherein the plurality of span-wise surface connectors interconnecting only the outlets of the film cooling holes in more than one selected row are defined in a single isolation trench.

8. The airfoil of claim 1, wherein the one or more isolation trenches in the external wall surface are at the leading edge of the airfoil, spaced apart from the leading edge of the airfoil, or both.

9. The airfoil of claim 8, wherein the one or more isolation trenches in the external wall surface that are spaced apart from the leading edge of the airfoil are in the pressure sidewall, the suction sidewall, or both.

10. A film cooling system for a component having an external wall surface to be cooled, the system comprising:
    one or more isolation trenches in the external wall surface;
    a plurality of film cooling holes in the component, the plurality of film cooling holes arranged in cooling rows and each film cooling hole having an inlet configured to receive cooling air and an outlet, the outlet opening onto the external wall surface;
    a plurality of span-wise surface connectors that interconnect only sequential outlets of the film cooling holes in the same cooling row to form a plurality of rows of interconnected film cooling holes, the span-wise surface connectors in at least one selected row of interconnected film cooling holes defined in one of the one or more isolation trenches, and the one of the one or more isolation trenches is formed over a length of the at least one selected row of interconnected film cooling holes and extends beyond a footprint of the at least one selected row of interconnected film cooling holes.

11. The film cooling system of claim 10, wherein the component comprises a turbine blade airfoil having a leading edge and the plurality of rows of interconnected film cooling holes comprises at least three rows of interconnected film cooling holes, a first row of the at least three rows comprising a first plurality of interconnected film cooling holes extending in a span-wise direction of the turbine blade airfoil and located substantially along a stagnation line of the leading edge, the at least three rows of interconnected film cooling holes further comprising:
    a second row comprising a second plurality of interconnected film cooling holes extending in a span-wise direction of the turbine blade airfoil and in the pressure sidewall at the leading edge; and a third row comprising a third plurality of interconnected film cooling holes extending in a span-wise direction of the turbine blade airfoil and in the suction sidewall at the leading edge.

12. The film cooling system of claim 11, wherein the at least one selected cooling row comprises the second row or the second and third rows.

13. The film cooling system of claim 10, wherein the one or more isolation trenches comprises a wedge-shaped groove having a depth that decreases in a downstream direction.

14. The film cooling system of claim 10, wherein the one or more isolation trenches comprise a single isolation trench for each selected row of interconnected film cooling holes.

15. The film cooling system of claim 10, wherein the plurality of span-wise surface connectors in more than one selected cooling row are defined in a single isolation trench of the one or more isolation trenches.

16. The film cooling system of claim 10, wherein each span-wise connector extends in a span-wise direction only between the outlets of the selected pair of the film cooling holes, the selected pair of the film cooling holes comprising sequential film cooling holes within the same cooling row.

17. A method for forming an improved film cooled component having an external wall surface, the method comprising the steps of:
    forming one or more isolation trenches in the external wall surface;
    forming a plurality of film cooling holes in the external wall surface and arranged in cooling rows; each film cooling hole having an inlet connected to a source of coolant and an outlet opening onto the external wall surface;
    forming a plurality of span-wise surface connectors in the external wall surface for interconnecting only the outlets of the film cooling holes within the same cooling row to form a plurality of rows of interconnected film cooling holes, wherein the span-wise surface connectors in at least one selected row of interconnected film cooling holes are defined in one of the one or more isolation trenches, and the one of the one or more isolation trenches is formed over a length of the at least one selected row of interconnected film cooling holes.

18. The method of claim 17, wherein the improved film cooled component comprises an airfoil of a turbine blade and the step of forming one or more isolation trenches comprises integrally forming the plurality of isolation trenches in a material of the turbine blade at the leading edge.

19. The method of claim 18, wherein the step of forming one or more isolation trenches comprises forming the one or more isolation trenches with a wedge-shape having a depth that decreases in a downstream direction.

20. The method of claim 17, wherein the step of forming one or more isolation trenches comprises forming a single isolation trench for one or more selected rows of interconnected film cooling holes.

* * * * *